United States Patent Office 3,408,445
Patented Oct. 29, 1968

3,408,445
TREATMENT OF INFLAMMATION WITH 1-METHYL - 3 - BENZOYL - 4 - HYDROXY - 4-PHENYLPIPERIDINE AND HALO DERIVATIVES THEREOF
Louis Levy, Encino, and David A. McClure, Canoga Park, Calif., assignors to Rexall Drug and Chemical Company, Los Angeles, Calif., a corporation of Delaware
No Drawing. Filed Apr. 10, 1967, Ser. No. 629,424
3 Claims. (Cl. 424—267)

ABSTRACT OF THE DISCLOSURE

This invention is directed to a method of alleviating the symptoms of inflammation in an animal suffering from an inflammatory condition which comprises the administration to such an animal of a pharmaceutically effective amount of 1-methyl-3-benzoyl-4-hydroxy-4-phenylpiperidine, 1-methyl-3-p-chlorobenzoyl-4 - hydroxy-4-p-chlorophenylpiperidine or 1-methyl-3-p-fluorobenzoyl-4-hydroxy-4-p-fluorophenylpiperidine.

---

This invention relates to a method of treating inflammation in animals.

The invention sought to be patented resides in the concept of a method of alleviating the symptoms of inflammation which comprises the administration, to an animal suffering such symptoms of a pharmaceutically effective non-toxic amount of 1-methyl-3-benzoyl-4-hydroxy-4-phenylpiperidine, 1-methyl-3-p - chlorobenzoyl - 4 -hydroxy - 4 - p-chlorophenylpiperidine or 1 - methyl - 3 - p-fluorobenzoyl - 4 - hydroxy - 4- p - fluorophenylpiperidine, or their hereinafter described equivalents.

As used throughout this application the term "lower alkyl" embraces both straight and branched chain alkyl radicals containing from 1 to 6 carbon atoms, for example, but without limitation, methyl, ethyl, n-propyl, isopropyl, n-butyl, tert-butyl, n-amyl, sec-amyl, n-hexyl, 2,3-dimethylbutyl, 2-ethylbutyl and the like, and the term "halo" includes chloro and fluoro.

The manner and process of making and using the invention will now be described generally so as to enable one skilled in the pharmaceutical arts to make and use the same as follows:

In acocrdance with the method of this invention a 1-methyl-3-benzoyl-4-hydroxy - 4 - phenylpiperidine or 1-methyl-3-p-halobenzoyl - 4 - hydroxy - 4 - p - halophenylpiperdine is administered to an animal suffering from the symptoms of inflammation in a non-toxic amount sufficient to alleviate such symptoms. In carrying out the method, the active ingredient is normally combined with conventional pharmaceutical diluents and carriers which are selected based upon the desired route of administration. The oral route is preferred due to ease of administration and subject acceptance. In carrying out the method, the active ingredient can, if desired, be combined with other therapeutically active compositions customarily included in anti-inflammatory formulations.

The individual unit dosage and frequency of administration is determined not only by the nature and severity of the inflammatory condition for which the relief is sought, but in addition upon age, weight, and species of subject, its underlying physical condition and the route of administration. The exact amount to be administered should be non-toxic, yet pharmaceutically effective in alleviating the symptoms of the inflammatory condition.

The best mode contemplated by the inventor for carrying out this invention will now be set forth as follows:

The 1-methyl-3-benzoyl-4-hydroxy-4 - phenylpiperidine or 1-methyl-3-p-halobenzoyl-4-hydroxy-4-p - halophenyl-piperidines used in the practice of this invention are conveniently prepared by mixing together acetophenone or a p-haloacetophenone, paraformaldehyde and methylamine hydrochloride and heating the mixture at 150° C. to form an N,N-bis-(2-benzoylethyl)methylamine or N,N-bis-[2-(p-halobenzoyl)ethyl]methylamine intermediate. If desired, the reaction may be carried out in the presence of an inert organic solvent such as ethanol, but the presence of solvent is not essential since the acetophenone or p-haloacetophenone reactant is a liquid and may also serve as the reaction solvent.

Ring closure and formation of the 1-methyl-3-benzoyl-4-hydroxy-4-phenylpiperidine or 1-methyl - 3 - p - halobenzoyl-4-hydroxy-4 - p - halophenylpiperidine is then accomplished by treating the intermediate, which need not have been purified, with aqueous base or alcoholic base, the latter being preferred. The product of this reaction is then recovered, isolated and purified by conventional methods.

The use of lower alkylamines other than methylamine in the above described synthesis results in the preparation of N,N-bis(2-benzoylethyl)lower alkylamine or N,N-bis-[2-(p-halobenzoyl)ethyl]lower alkylamine intermediates and 1-lower alkyl-3-benzoyl-4-hydroxy-4-phenylpi-perdine or 1-lower alkyl-3-p-halobenzoyl-4-hydroxy-4-p-halophenylpiperidine final products that correspond to the particular alkylamine employed. Among such useful alkylamines are ethylamine, n-propylamine and the like containing up to 6 carbon atoms. Such final products are also useful in practicing the present invention and their use is included within the scope of this invention.

For use in the practice of this invention, the 1-methyl-3-benzoyl-4-hydroxy-4-phenylpiperidine or 1 - methyl - 3-p-halobenzoyl-4-hydroxy-4-p - halophenylpiperidine can, if desired, be converted into its non-toxic pharmaceutically acceptable acid-addition or quarternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the proprionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed with such alkyl halides as methyliodide, n-hexylbromide and the like. The use of such pharmaceutically acceptable acid-addition or quaternary ammonium salts in the practice of this invention is fully equivalent to the use of the free bases from which they are derived, and such use is included within the scope of this invention.

The 1-methyl-3-benzoyl-4-hydroxy-4 - phenylpiperidine that is useful in the practice of this invention is conveniently prepared as described by Plati and Wenner in U.S. Patent 2,489,669 while the following example illustrates the preparation of the 1-methyl-3-p-halobenzoyl-4-hydroxy-4-p-halophenylpiperidines useful in the practice of this invention.

EXAMPLE 1.—1-methyl-3-p-fluorobenzoyl-4-hydroxy-4-p-fluoropiperidine (a) N,N-bis-[2-(p - fluorobenzoyl)ethyl]methylamine hydrochloride.—p - Fluoroacetophenone (150 g., 1.09 mole), paraformaldehyde (36 g., 1.2 mole) and methylamine hydrochloride, (36.8 g., 0.55 mole) are stirred and heated on an oil bath for 5 minutes at 150° C. Ethanol (250 ml.) is added with stirring and the mixture allowed to stand for two hours at 5° C. The crystalline product is recovered by filtration, washed with ethanol and ether and then dried. Yield 113 g. (57%): M.P. 150° C.

(b) 1 - methyl - 3 - p - fluorobenzoyl - 4 - hydroxy - 4 - p-fluorophenylpiperidine.—The bis-amine hydrochloride (110 g., 0.3 mole), formed in (a), is dissolved in boiling water (700 ml.) with stirring and hot 6% sodium hydroxide solution (350 ml.) added. An oil precipitates upon addition of the base that solidifies upon cooling and stirring. The solid is collected by filtration, washed with water, air dried and recrystallized from methanol. Yield 59 g. (56.5%); M.P. 145°–147° C.

*Analysis.*—Calculated for $C_{19}H_{19}NO_2F_2$: C, 69.00%; H, 5.79%; N, 4.23%. Found: C, 68.65%; H, 5.71%; N, 4.50%.

The same method may be used to prepare the 1-methyl-3 - p - chlorobenzoyl - 4 - hydroxy - 4 - p - chlorophenylpiperidine, M.P. 168°–170° C.

The following examples present pharmacological data establishing the anti-inflammatory activity of 1-methyl-3-benzoyl-4-hydroxy-4-phenylpiperidine and 1-methyl-3-p-halobenzoyl - 4 - hydroxy - 4 - p - halophenylpiperidines. In the examples, 1 - methyl - 3 - p - chlorobenzoyl - 4 - hydroxy-4-p-chlorophenylpiperidine is designated as "Compound A," 1-methyl-3-p-fluorobenzoyl-4-hydroxy-4-p-fluorophenylpiperidine is designated as "Compound B," and 1-methyl-3-benzoyl-4-hydroxy-4-phenylpiperidine is designated as "Compound C."

EXAMPLE 2

Acute toxicity determinations, in accordance with standard pharmacological test procedures, made for the various compounds used in these examples reveal the following.

LD$_{50}$ DETERMINATIONS

| Compound | Form | Animal | Route | LD$_{50}$ mg./kg. |
|---|---|---|---|---|
| A | Base | Mouse | i.p. | >800 |
| B | Base | Mouse | i.p. | >800 |
| | | | p.o. | 2,000 |
| | | Rat | i.p. | 1,000 |
| | | | p.o. | >2,000 |
| | HCl salt | Mouse | i.p. | 116 |
| | | | p.o. | 530 |
| | | Rat | i.v. | 55 |
| | | | p.o. | 740 |
| C | HCl salt | Mouse | i.p. | 380 |
| Prednisolone [1] | Acetate | Mouse | i.p. | >800 |
| Indomethacin [2] | Base | Mouse | i.p. | 282 |
| Aspirin | Base | Mouse | i.p. | 400 |

[1] Prednisolone—11β,17α,21-trihydroxy-1,4-pregnadiene-3,20-dione.
[2] Indomethacin—1-(p-chlorobenzoyl)-5-methoxy-2-methylindole-3-acetic acid.

EXAMPLE 3

The comparative effect on an inflammatory condition known as adjuvant-induced polyarthritis in rats was determined for Compounds A and B together with several well-known anti-inflammatory agents. The method used was that described by Ward and Cloud, J. Pharm. Exptl. Therap. 152:116–121 (1966).

The arthritic syndrome is induced by intradermal injection, into the plantar surface of one hind paw of a rat, of 0.1 ml. of a fine suspension of dead tubercular bacilli in mineral oil. The rats used are Carworth males of approximately 200 g. body weight. Each group, including an untreated control group, consists of six animals. The drugs are administered orally in the diet beginning on the day of adjuvant injection.

Paw size is measured by immersion of the injected hind paw into a pool of mercury. The pressure increase caused by the slight rise in mercury level is transmitted to a venous-pressure transducer designed to transmit a signal to a recording polygraph. The polygraph was calibrated by introduction of known volumes into the mercury and measuring pen excursion in millimeters, this being converted to milliliters to indicate mercury displacement and, hence, volume of edematous fluid in the immersed limb. The measurement method together with equipment typically employed is described by Van Arman et al. J. Pharm. Exptl. Therap. 150:328–344 (1965).

In the control animals swelling and redness in the injected hindlimb comprises an inflammatory reaction that subsides somewhat after about 8 to 9 days and then increases with the appearance of disseminated arthritis. In experimental animals the inflammatory reaction is characterized by the same pattern of swelling and redness followed by subsidence and subsequent increase, but the reaction at all stages is considerably inhibited in direct relationship to the anti-inflammatory activity of the drug administered.

The following chart summarizes the inhibitory effect of Compounds A and B in comparison to that produced by several known anti-inflammatory agents:

COMPARATIVE ACTIVITY OF SEVERAL COMPOUNDS IN THE ADJUVANT ARTHRITIS TEST IN RATS [a]

| Drug and Dose | Day 7 Increase in Volume (ml.) | Day 7 Percent of Control | Day 10 Increase in Volume (ml.) | Day 10 Percent of Control | Day 15 Increase in Volume (ml.) | Day 15 Percent of Control |
|---|---|---|---|---|---|---|
| Control | 1.765 | 100 | 1.156 | 100 | 2.048 | 100 |
| Aspirin, 200 mg./kg./day | 0.908 | 51 | 0.583 | 50 | 1.986 | 97 |
| Indomethacin, 1 mg./kg./day | 0.897 | 51 | 0.640 | 55 | 1.687 | 82 |
| Prednisolone acetate, 2 mg./kg./day | 1.070 | 60 | 0.480 | 41 | 0.957 | 46 |
| "B", 200 mg./kg./day | 0.828 | 47 | 0.631 | 54 | 1.173 | 57 |
| "A" 200 mg./kg./day | 1.376 | 78 | 0.918 | 80 | 1.333 | 65 |

[a] Average values for 6 rats per group.

The results of this experiment show that Compounds A and B compare favorably with known anti-inflammatory agents in inhibiting the development of adjuvant-induced polyarthritis in rats.

EXAMPLE 4

Using the technique described in Example 2, the effect of Compound B upon an established, preexisting inflammatory condition was determined. In this experiment drug administration was begun 8 days after the injection of adjuvant, after development of the adjuvant polyarthritis inflammatory condition. The drug was given at three dose levels and paw volume measured of the injected paw 3, 7, 10 and 14 days after administration of the drug was begun. The drug was administered daily in the animal's normal diet and dosages indicated represent mg./kg./day.

EFFECT OF COMPOUND "B" ON ESTABLISHED INFLAMMATORY CONDITION

| Group and dose | Volume (ml.) | | | Days After Drug Started | | | |
|---|---|---|---|---|---|---|---|
| | Pre-injection | 8 Days Post-injection | | 3 | 7 | 10 | 14 |
| | | | | Volume (ml.) | | | |
| Control | | | D R U G   A D M I N I S T E R E D | 3.20 | 3.99 | 4.63 | 5.40 |
| Prednisolone acetate, 4 mg./kg. | | | | 2.63 | 2.75 | 2.57 | 2.42 |
| Compound B, 400 mg./kg. | | | | 2.76 | 2.93 | 2.75 | 3.16 |
| Compound B, 200 mg./kg. | 1.57 | 2.92 | | 3.15 | 3.62 | 3.99 | 4.23 |
| Compound B, 100 mg./kg. | | | | 3.10 | 3.80 | 3.95 | 4.34 |

These results show that Compound B is capable of arresting further development of an existing inflammatory condition and maintaining it at or below pretreatment levels.

EXAMPLE 5

The comparative effect on carrageenin-induced edema in the hind paw of the rat was also determined for Compounds A, B and C and two well-known anti-inflammatory agents. The method used was that described by Winter et al., Proc. Soc. Exptl. Biol. & Med. 111:544–547 (1962).

The edema is induced by injection into the plantar surface of the right hind paw of a rat, of carrageenin, prepared as a 1% suspension in sterile 0.9% sodium chloride solution. The volume injected is 0.05 ml. The volume of the paw is measured immediately after injection with carrageenin and again three hours later. The difference in volume between the two measurments indicates the increase due to swelling caused by edematous fluid. Volume measurements are made as described in Example 2.

One hour before injection with carrageenin the experimental animals are administered the drug by intubation in a volume of 5.0 ml. per rat. The control animals receive 5.0 ml. of water.

The following chart shows the percentage of inhibition caused by Compounds A and B as free bases, Compounds B and C as the hydrochloride salt, indomethacin, and prednisolone.

COMPARATIVE ACTIVITY OF SEVERAL COMPOUNDS IN THE CARRAGEENIN-INDUCED RAT PAW EDEMA TEST

| Group | Form | Dose, mg./kg. | Percent Inhibition |
|---|---|---|---|
| Control | | | 0 |
| Compound A | Base | 30 | 20 |
| | | 300 | 100 |
| Compound B | Base | 30 | 13 |
| | | 100 | 44 |
| | | 300 | 80 |
| | HCl Salt | 10 | 0 |
| | | 30 | 0 |
| | | 100 | 40 |
| Compound C | HCl Salt | 50 | 0 |
| | | 100 | 42 |
| | | 190 | 55 |
| Indomethacin | Base | 1 | 29 |
| | | 10 | 100 |
| Prednisolone | Acetate | 1 | 51 |
| | | 10 | 84 |

These results show that Compounds A, B and C compare favorably with the known anti-inflammatory agents prednisolone acetate and indomethacin.

The subject matter which the applicants regard as their invention is particularly pointed out and distinctly claimed as follows:

1. A method of alleviating the symptoms of inflammation which comprises the administration to an animal suffering from such symptoms of a pharmaceutically effective non-toxic amount of 1-methyl-3-p-chlorobenzoyl-4-hydroxy-4-p-fluorophenylpiperidine.

2. A method of alleviating the symptoms of inflammation which comprises the administration to an animal suffering from such symptoms of a pharmaceutically effective non-toxic amount of 1-methyl-3-p-fluorobenzoyl-4-hydroxy-4-p-fluorophenylpiperidine.

3. A method of alleviating the sysmptoms of inflammation which comprises the administration to an animal suffering from such symptoms of a pharmaceutically effective non-toxic amount of 1-methyl-3-benzoyl-4-hydroxy-4-phenylpiperidine.

References Cited

UNITED STATES PATENTS

| 2,489,669 | 11/1949 | Plati et al. | 260—294.7 |
| 2,546,159 | 3/1951 | Kaegi et al. | 260—294.7 |
| 3,061,609 | 10/1962 | Cusic et al. | 167—65 |
| 3,317,548 | 5/1967 | Draper | 260—294.7 |

ALBERT T. MEYERS, *Primary Examiner.*

S. FRIEDMAN, *Assistant Examiner.*

UNITED STATES PATENT OFFICE
CERTIFICATE OF CORRECTION

Patent No. 3,408,445

October 29, 1968

Louis Levy et al.

It is certified that error appears in the above identified patent and that said Letters Patent are hereby corrected as shown below:

Column 6, line 44, "-4-p-fluorophenylpiperidine" should read -- -4-p-chlorophenylpiperidine --.

Signed and sealed this 3rd day of March 1970.

(SEAL)
Attest:

Edward M. Fletcher, Jr.
Attesting Officer

WILLIAM E. SCHUYLER, JR.
Commissioner of Patents